United States Patent Office 3,020,269
Patented Feb. 6, 1962

3,020,269
BUTADIENE POLYMERIZATION
Edward C. Leonard, Jr., Bloomfield, N.J., assignor to Union Carbide Corporation, a corporation of New York
No Drawing. Filed Jan. 10, 1957, Ser. No. 633,396
5 Claims. (Cl. 260—94.3)

This invention relates to a new process for polymerizing butadiene. More particularly it is concerned with the production of crystalline polybutadiene having a high content of trans-1,4 units.

The catalytically promoted polymerization of butadiene is well known in the art and many catalysts have been suggested, as for example, aluminum trichloride and the other Friedel-Crafts type compounds, the addition products formed with boron fluoride and aliphatic alcohols and metallic sodium. However, all of these processes produce amorphous non-crystalline polybutadienes which consist of mixtures of stereoisomeric forms; namely, the trans-1,4, cis-1,4 and the 1,2 forms, which can be represented by the following formulae:

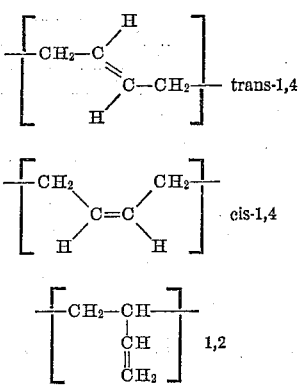

For example, emulsion-polymerized polybutadiene produced in the presence of catalysts such as alkali perborates, hydrogen peroxide or organic peroxides is amorphous and consists of about 80% cis- and trans-1,4 units and about 20% 1,2 units. On the other hand, sodium-initiated polybutadiene is an amorphous product containing nearly 70% 1,2 units with the balance being cis- and trans-1,4 units.

It has now been found that crystalline polybutadiene showing infra-red absorption bands at 8.1, 9.5 and 13.0 microns, bands which are absent in amorphous polybutadiene, can be prepared having a content of trans-1,4 units of at least about 90%. This crystalline polybutadiene can be produced at good polymerization rates by polymerizing 1,4-butadiene in the presence of a polymerization catalyst consisting of a mixture of triisobutylaluminum and vanadium tetrachloride. The freshly prepared polymer is readily soluble in boiling xylene and precipitates in the presence of methanol; polymer so treated has a fairly sharp melting point at 130° C. and a reduced viscosity of 3.9, using a 0.2 g. sample in 100 ml. of toluene at 25° C. On exposure to air oxidation occurs and the polymer becomes less soluble in boiling xylene and its melting point rises; however, infra-red analysis indicates that while its content of trans-1,4 units does not change the polymer does become less crystalline. The xylene soluble form of polybutadiene can be stabilized by the addition of an antioxidant; for example 2,6 tertiary butyl para cresol. This is usually added to the extent of about 1% by weight of the polymer to the xylene solution of the freshly prepared polymer and also to the methyl alcohol into which the xylene solution is filtered to precipitate the polymer. Polymer so stabilized, retains its solubility in boiling xylene, for at least a month of exposure to air oxidation.

In accordance with the present invention butadiene is polymerized in the presence of a catalyst prepared by mixing triisobutylaluminum and vanadium tetrachloride in an inert anhydrous hydrocarbon diluent. The molar ratio of triisobutylaluminum to vanadium tetrachloride can be varied from about 1:1 to about 16:1; however, it is preferred that the Al:V molar ratio in the catalyst composition be in the range of about 3:1 to about 10:1, with a 4:1 molar ratio being the most preferred ratio.

To effect polymerization the catalyst composition is added to an inert hydrocarbon diluent such as cyclohexane so that a concentration of about 1% by weight of catalyst based on the weight of diluent is obtained. The catalyst-containing diluent is stirred at about 20° C. to about 75° C. and butadiene is bubbled in and a slurry of the polymer is produced. Then an aliphatic alcohol such as methanol is added to the slurry to stop the reaction and the polymer is further washed with alcohol to remove most of the catalyst. The polymer may be dissolved in boiling xylene and filtered hot into methanol to reprecipitate the polymer and remove small amounts of insoluble material therefrom.

Among the hydrocarbon diluents suitable for use in this invention are heptane, hexane or benzene.

The polymerization may be carried out at temperatures of from about 20° C. to about 75° C. The preferred range, however, is from about 40° C. to about 60° C.

The rate of addition of the butadiene cannot be fixed within specific limits since it will be dependent on many factors; for example, the concentrations of the catalyst components, the total catalyst concentration, the reaction temperature, the pressure, and the size of the equipment being used. However, it has been found that a feed rate of about 6 g. per minute with a diluent volume of about 500 ml. containing about 1% by weight of catalyst, at about 50° C. gives a good polymerization rate.

The polybutadiene produced by the process of this invention may be molded or extruded into sheets and tubes; it is also suitable for use as golf ball covers, electrical insulation, transmission belts, and in other applications wherein gutta-percha has been employed.

The following examples further serve to illustrate this invention.

*Example 1*

Five-hundred ml. of anhydrous cyclohexane was charged to a one liter three-necked Pyrex flask which was equipped with a stirrer, therermometer, and a gas inlet tube to introduce the gaseous butadiene below the liquid surface. The apparatus was purged with butadiene and a solution of 10 ml. of triisobutylaluminum and 2 g. of vanadium tetrachloride, having a 4:1 Al:V molar ratio, dissolved in 20 ml. of cyclohexane was added to the flask and addition of butadiene was resumed. A dark suspension immediately formed and within a few seconds the reaction mixture became viscous. Butadiene was bubbled in at the rate of about 6 g. per minute for a 5 minute period at a temperature range of from 25° C. to 41° C. Discontinued the addition of butadiene, added about 10 ml. of methanol to stop the reaction and then filtered off the precipitated polymer. The polymer was macerated in about 100 ml. of methanol, filtered and then dried. Yield of polymer was 10 g. Infra-red and X-ray analysis showed a 45% by weight crystalline content which was about 90% trans-1,4 in structure.

The following examples were carried out using the procedure described in Example 1 but varying the Al:V molar ratios and the temperature at which the polymerization was conducted.

| Example | 2 | 3 | 4 | 5 | 6 | 7 |
|---|---|---|---|---|---|---|
| Cyclohexane, ml | 500 | 500 | 500 | 500 | 3,000 | 3,000 |
| Triisobutylaluminum, ml | 7.5 | 10 | 10 | 10 | 20 | 20 |
| Vanadium tetrachloride, g | 4 | 1 | 0.5 | 2 | 4 | 4 |
| Al:V molar ratio | 1.5:1 | 8:1 | 16:1 | 4:1 | 4:1 | 4:1 |
| Temperature, °C | 25-40 | 25-40 | 25-40 | 25-51 | 60-70 | 60-70 |
| Reaction time, min | 5 | 5 | 5 | 30 | 10 | 5 |
| Yield, g | 3 | 8 | 2 | 22 | 23 | 15 |
| Crystallinity, percent by weight | 45 | 45 | 45 | 45 | 45 | 45 |
| Trans-1,4 content, percent | 90 | 90 | 90 | 90 | 90 | 90 |

What is claimed is:

1. A process for the polymerization of butadiene to form polybutadiene having a trans-1,4 content of at least 90 percent which comprises contacting butadiene with a catalytic amount of a polymerization catalyst sufficient to polymerize said butadiene consisting of a mixture of vanadium tetrachloride and triisobutylaluminum in such proportions that the Al:V molar ratio is within the range of about 1:1 to about 16:1, in the presence of an inert hydrocarbon diluent and at a temperature above about 20° C.

2. A process for the polymerization of butadiene to form polybutadiene having a trans-1,4 content of at least 90 percent which comprises contacting butadiene with a catalytic amount of a polymerization catalyst consisting of a mixture of triisobutylaluminum and vanadium tetrachloride, said mixture having an Al:V molar ratio within the range of about 1:1 to about 16:1, in the presence of an inert hydrocarbon diluent, while maintaining the temperature within the range of about 20° C. to about 75° C.

3. A process for the polymerization of butadiene to form polybutadiene having a trans-1,4 content of at least 90 percent which comprises contacting butadiene with a catalytic amount of a polymerization catalyst consisting of a mixture of triisobutylaluminum and vanadium tetrachloride, said mixture having an Al:V molar ratio within the range of about 3:1 to about 10:1, in the presence of an inert hydrocarbon diluent, while maintaining the temperature within the range of about 40° C. to about 60° C.

4. A process for the polymerization of butadiene to form polybutadiene having a trans-1,4 content of at least 90 percent which comprises contacting butadiene with a catalytic amount of a polymerization catalyst consisting of a mixture of triisobutylaluminum and vanadium tetrachloride, said mixture having an Al:V molar ratio of about 4:1, in the presence of an inert hydrocarbon diluent, while maintaining the temperature at about 50° C. to about 60° C.

5. A process for producing crystalline polybutadiene containing at least 90% of the butadiene units linked together in the trans-1,4 configuration, which comprises contacting butadiene with a catalytic amount of a polymerization catalyst consisting of a mixture of triisobutylaluminum and vanadium tetrachloride, said mixture having an Al:V molar ratio of about 3:1 to about 10:1, in the presence of an inert hydrocarbon diluent, while maintaining the temperature at about 20° C. to about 75° C.

References Cited in the file of this patent

UNITED STATES PATENTS

| 2,683,140 | Howard | July 6, 1940 |
| 2,832,759 | Nowlin et al. | Apr. 29, 1958 |
| 2,882,264 | Barnes et al. | Apr. 14, 1959 |
| 2,898,329 | Kittleson | Aug. 4, 1959 |
| 2,905,659 | Miller et al. | Sept. 22, 1959 |
| 2,910,461 | Nowlin et al. | Oct. 27, 1959 |

FOREIGN PATENTS

| 533,362 | Belgium | May 16, 1955 |

OTHER REFERENCES

Modern Plastics, volume 31, No. 7, March 1954, page 49.

Binder: Ind. and Engr. Chem., vol. 46, No. 8, August 1954, pp. 1727-1730.

Natta: Die Makromolekulare Chemie, volume 16, No. 3, October 1955, page 234 relied upon.